US012708910B2

(12) United States Patent
Sola et al.

(10) Patent No.: US 12,708,910 B2
(45) Date of Patent: Aug. 18, 2026

(54) SYSTEM AND A METHOD FOR REDUCING PARTICULATE POLLUTANTS IN AIR, USING PULSED ELECTROMAGNETIC WAVES

(71) Applicant: DEVIC EARTH PRIVATE LIMITED, Karnataka (IN)

(72) Inventors: Srikanth Sola, Kannamangala (IN); Radhica Kanniganti, Kannamangala (IN); Malini Menon, Kannamangala (IN); Francisca Kalavathi, Kannamangala (IN)

(73) Assignee: DEVIC EARTH PRIVATE LIMITED, Karnataka (IN)

( * ) Notice: Subject to any disclaimer, the term of this patent is extended or adjusted under 35 U.S.C. 154(b) by 483 days.

(21) Appl. No.: 18/007,984

(22) PCT Filed: Feb. 18, 2021

(86) PCT No.: PCT/IN2021/050156
§ 371 (c)(1),
(2) Date: Dec. 2, 2022

(87) PCT Pub. No.: WO2021/245687
PCT Pub. Date: Dec. 9, 2021

(65) Prior Publication Data

US 2023/0226557 A1 Jul. 20, 2023

(30) Foreign Application Priority Data

Jun. 2, 2020 (IN) ............................. 202041023125

(51) Int. Cl.
*B03C 3/017* (2006.01)
*B03C 3/38* (2006.01)
(Continued)

(52) U.S. Cl.
CPC .............. *B03C 3/0175* (2013.01); *B03C 3/38* (2013.01); *B03C 3/68* (2013.01); *H01Q 3/24* (2013.01); *H01Q 25/002* (2013.01); *H04B 1/04* (2013.01)

(58) Field of Classification Search
CPC ......... B01D 49/00; B03C 3/0175; B03C 3/38; B03C 3/68; H01Q 25/002; H01Q 3/24; H04B 1/04
See application file for complete search history.

(56) References Cited

U.S. PATENT DOCUMENTS 3,892,544 A * 7/1975 Haupt ........................ B03C 3/68 55/DIG. 25
3,984,215 A * 10/1976 Zucker ...................... B03C 3/68 96/25

(Continued)

FOREIGN PATENT DOCUMENTS

CA 3 174 425 A1 10/2021

OTHER PUBLICATIONS

Mudur, Radio Waves to Beat Pollution? Scientists are Surprised, The Telegraph Online, Oct. 16, 2018 (Year: 2018).*

(Continued)

*Primary Examiner* — Jennifer Dieterle
*Assistant Examiner* — Sonji Turner
(74) *Attorney, Agent, or Firm* — Sughrue Mion, PLLC

(57) ABSTRACT

Disclosed is a system and method for reducing particulate pollutants in air, using pulsed electromagnetic waves. The disclosed system 200 comprises a device 215 configured for radiating radio waves, preferably in the frequency range of 800 MHz to 5 GHz in a predefined pulsed manner. Essentially, the disclosed device comprises a radiofrequency oscillator 315 configured for oscillating at the predefined frequency. The signal is then suitably power amplified with an (Continued)

RF amplifier 310 and using a suitable switch 235 the amplified output is routed to one of an omnidirectional antenna 240 and directional antenna 245 for radiating the pulsed radio waves to the atmosphere.

7 Claims, 3 Drawing Sheets

(51) Int. Cl.
*B03C 3/68* (2006.01)
*H01Q 3/24* (2006.01)
*H01Q 25/00* (2006.01)
*H04B 1/04* (2006.01)

(56) References Cited

U.S. PATENT DOCUMENTS 6,061,034 A * 5/2000 Agee .................... H01Q 21/061 342/374
2013/0255482 A1* 10/2013 Goodson .................. B03C 3/68 96/24
2015/0352564 A1 12/2015 Genereux et al.
2016/0329935 A1 11/2016 Singerl et al.
2017/0167743 A1 6/2017 Dempsey et al.
2019/0391227 A1 12/2019 Zhang et al.
2024/0033676 A1* 2/2024 Gomez Verdejo ..... B01D 46/00

OTHER PUBLICATIONS

Do Radio Waves or microwaves accelerate Particulate Matter?, ResearchGate, Nov. 10, 2018 (Year: 2018).*
Calle, C., et al., "Dust Particle Removal by Electrostatic and Dielectrophoretic Forces with Applications to NASA Exploration Missions", ESA Annual Meeting on Electrostatic, Session 01, Jun. 19, 2008, 14 pages.
International Search Report for PCT/IN2021/050156 dated May 25, 2021 [PCT/ISA/210].
Written Opinion for PCT/IN2021/050156 dated May 25, 2021 [PCT/ISA/210].
Canadian Patent Office, Communication issued Apr. 4, 2025 in copending Application No. 3,181,245.
European Patent Office, Communication issued Mar. 14, 2024 in copending Application No. 21 81 8405.

* cited by examiner

| | Active purifying technologies | | | Passive purifying technology | |
|---|---|---|---|---|---|
| | ESP | Negative ion | Ozone | HEPA | Activated carbon |
| Principle | High intensity electric field | Negatively charged oxygen ions attract airborne particles | Ozone reacts with strong odors and airborne chemicals | Particulate filters reduce airborne particles of sizes > 0.3 microns | Activated carbon filters |
| Advantage | Removes solid particles and liquid droplets | Inexpensive and no filters to replace | Effective at removing odors and clearing molds and mildew | Effective method to trap particulate pollutants | Efficient at reducing volatile organic compounds |
| Disadvantage | Cannot be used for gaseous pollutant control | Can cover a maximum distance of 2 m from the device | Not approved due to health risks | Does not remove chemicals, gases or odors<br>High operation and maintenance cost | Low efficiency at removing allergens and airborne particles |

Figure 1

SYSTEM AND A METHOD FOR REDUCING PARTICULATE POLLUTANTS IN AIR, USING PULSED ELECTROMAGNETIC WAVES

CROSS REFERENCE TO RELATED APPLICATIONS

This application is a National Stage of International Application No. PCT/IN2021/050156, filed on Feb. 18, 2021, which claims priority from India patent application No. 202041023125, filed on Jun. 2, 2020.

FIELD OF INVENTION

The present disclosure relates to the field of reducing particulate pollutants in air. In particular, it belongs to the field of use of electromagnetic radiation for reducing particulate pollutants in air.

BACKGROUND OF THE INVENTION

Air pollution affects 92% of the world's population and is estimated to causes 7 million premature deaths annually. It is also estimated that it costs developing countries 8.5% of their Gross Domestic Product. Poor air quality is a matter of great concern in developing countries. Particulate matter has long been recognized as one of the key pollutants detrimental to human health (Harrison and Yin, 2000; Leiva G et al., 2013; Martinelli, Olivieti and Girelli, 2013).

There is compelling evidence of the adverse effects of particulate matter on public health at exposure levels as experienced by global urban populations (World Health Organization, 2005). A recent survey by the National Clean Air Program initiative identified 102 non-attainment cities in India, which fail to meet the National ambient air quality standards. Conventional pollution management strategies to improve air quality include promoting green energy efficient fuels as alternatives to fossil fuels. Efforts also include the use of green transportation systems. Use of Electrostatic precipitators, scrubbers, filters for industrial establishments are mandated by law and efforts towards improved enforcement of compliance in industries are under way.

Despite these measures, air pollution continues to increase. Although there are several air pollution control devices in the market, most of them are associated with high initial capital cost, high operation and maintenance cost and low area of coverage.

Conventionally, there are two types of air purifying technologies available—active and passive. Active air purifiers release negatively charged ions into the air, causing pollutants to stick to surfaces, while passive air purification units use air filters to remove pollutants.

The most common types of air purifier technologies are listed below:

HEPA Technology
Activated Carbon Technology
Electrostatic precipitator
Negative Ion
Ozone The main features of each of these technologies along with their major advantages and disadvantages are shown in the table in FIG. 1.

High Efficiency Particulate Air (HEPA) technology uses filters that must meet predefined standards. Large particles are unable to pass through the openings of the fibers and are caught. The smaller particles get caught by one of three mechanisms—interception, impaction and diffusion. HEPA air purifiers are the most effective at trapping airborne particles.

Activated Carbon Technology uses a form of carbon that has been processed to make it extremely porous and to give it a very large surface area for absorption and adsorption. Air purifiers with activated carbon filters are particularly helpful to people with Multiple Chemical Sensitivity (MCS) because they absorb formaldehyde, which is found in carpet, wood paneling, and furniture upholstery. Activated Carbon air filters help in reducing the contamination of the air. They do, however, have a low efficiency in removing allergens and airborne particles. They also act in closed spaces and with limited range.

Electrostatic precipitator also called electrostatic air cleaner is a device that uses a high-intensity electric field to remove certain impurities—solid particles and liquid droplets from air or gases in smokestacks and flues. Originally configured for recovery of valuable industrial process materials, electrostatic precipitators are used for air pollution control. Dust particles, once collected, are removed from the collector plates periodically. Electrostatic precipitators are efficient in removing particulate pollutants and can be used to collect dry as well as wet pollutants at low operating costs in industrial smokestacks. However, electrostatic precipitators have a high initial capital cost. They require large spaces for installation and once installed they are not flexible in operation.

Negative Ion air purifiers use chemical injections to clean the air. An ion is a particle with either a positive or negative charge. Negative ions are simply atoms that have gained an electron. They attract airborne particles such as pollen and dust, until the newly formed particles are too heavy to remain suspended in air. This causes the particle to drop and settle, leaving the air cleaner.

Ozone air purifiers produce ozone ($O_3$) which reacts with strong odors and airborne chemicals. Although it is believed that these devices are safe and effective in controlling indoor air pollution, governments have not approved these devices, because it may cause breathing difficulties in some people and may also be carcinogenic. Further, Ozone itself is considered to be a pollutant.

All these device and methods are useful in a limited area or in enclosed spaces.

SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

Thus, there is no method or system available that can reduce particulate pollutants across a large area. Thus, there has been a long felt need for a method of purifying air of particulate matter and gaseous pollutants and an air purifier device that clears the ambient air of suspended particles or particulate pollutants.

This disclosure discloses a method of purifying air that can overcome at least one of the disadvantages of the state of the art methods in purifying air of particulate matter and also some gaseous pollutants.

This disclosure discloses an air purifier system that can overcome at least one of the disadvantages of the state of the art systems in purifying air of particulate matter contained in it and also some gaseous pollutants.

The disclosed method comprises radiating pulsed electromagnetic radiation in the radiofrequency band for accelerating the agglomeration of particulate matter in the air such that they settle down as aggregates and thereby reduce the percentage of particulate matter in the air. The interaction of suspended particulate matter of size less than 10 μm with the radio waves causes them to agglomerate, become heavier and hence their precipitation is speeded up. Thus the suspended particulate matter settles down faster than they would otherwise do. The clearance or transport of particles from the air to the solid surfaces in the absence of precipitation occurs by the natural phenomenon of Dry deposition. Further, the method is effective in operation over a large area surrounding the system—up to a radius of 1 to 3 kilometers.

Also disclosed is a device for radiating pulsed electromagnetic radiation in the radiofrequency band, with a predefined nominal frequency for promoting the agglomeration of particulate matter in the air such that they settle down as a precipitate and thereby reduce the percentage of particulate matter in the air.

This disclosure further discloses a system, comprising the disclosed device whereby the purification of air can be managed effectively.

The disclosed system is configured for radiating radio waves, preferably in the frequency range of 800 MHz to 5 GHz in a predefined pulsed manner. Essentially the disclosed system comprises the device comprising a radiofrequency oscillator tuned to or otherwise configured for oscillating at the predefined frequency. The signal is then suitably power amplified and using a suitable switch the amplified output is routed to a radiating antenna. In one embodiment there are two antennae, one polarizing omnidirectional antenna and a directional antenna. The omnidirectional antenna is used for all round coverage to induce agglomeration of particulate matter all around the system. The directional antenna is used when the source of the pollution is known and the emission of particulate matter is to be controlled at the source, to prevent it from spreading to a larger area. The power amplified signal is pulsed with variations in echo train length (5 to 200), duty cycle (10% to 80%), and pulse power amplitude (20% to 100% of max power).

Further to clarify the advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosed method, device, and system will be described and explained with additional specificity and detail with the accompanying figures.

BRIEF DESCRIPTION OF FIGURES

The disclosure will be described and explained with additional specificity and detail with the accompanying figures in which:

FIG. 1 shows a table comparing the prior art methods for preventing or reducing ambient or/and indoor pollution;

Figure 2:
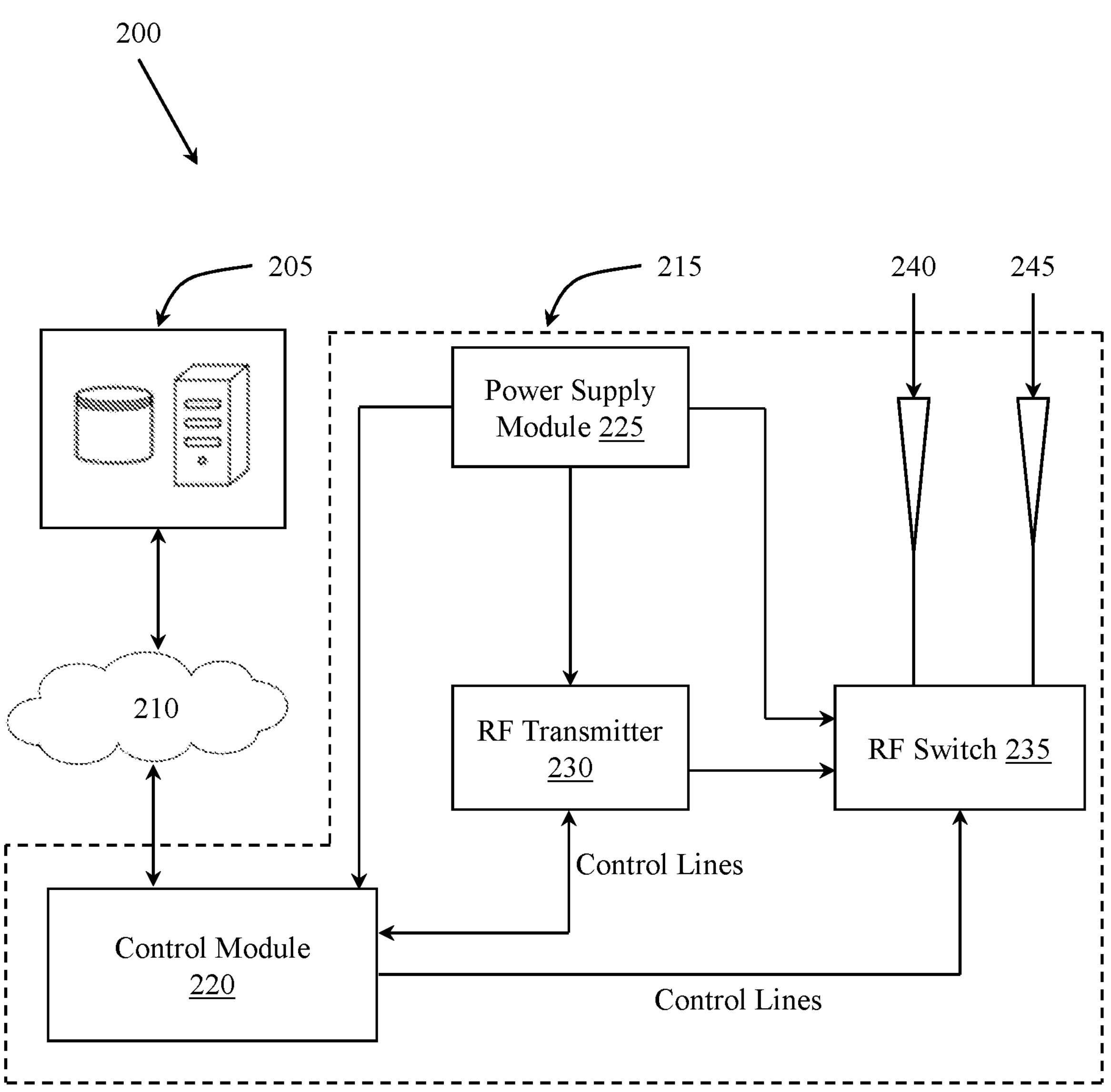
FIG. 2 is a block diagram of a system for reducing; particulate pollutants in air in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction of the joining ring and one or more components of the bearing assembly may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

While aspects of proposed disclosure may be implemented in any number of different computing systems, environments, and/or configurations, the embodiments are described in the context of the following exemplary environment.

FIG. 2 is a block diagram of a system for reducing; particulate pollutants in air in accordance with an embodiment of the present disclosure. As shown, the system 200 comprises a server 205, a communication network 210 and a device for generating pulsed electromagnetic waves 215 (hereinafter referred to as device 215), wherein the device 215 comprises a control module 220, a power supply module 225, an RF transmitter 230, an RF switch 235 and two antennae 240 and 245.

The server 205 may include, for example, a computer server or a network of computers or a virtual server comprising one or more processors, associated processing modules, interfaces and storage devices. As shown, the server 205 is communicatively connected to the device 215 through the communication network 210. In one embodiment of the present disclosure, the server 205 is configured for communicating operating instructions to the device 215 for operating the device 215 depending on one or more factors. The one or more factors may include, but not limited to, a geographical location of the device 215, a current atmospheric condition, that is, the ambient temperature and relative humidity or both, at the geographical location of the device 215, an estimate of the pollution characteristics at the geographical location and one or more inputs provided by a user of the device 215. In other words, the server 205 enables remote operation of the device 215 for reducing the air pollution. Further, the server 205 is configured for monitoring the state of health of the device 215. It is to be noted that the server 205 may be communicatively connected with a plurality of devices, each being of the type similar to the device 215, for controlling the air pollution using various devices at the same or different geographical locations and for monitoring the health of the plurality of devices.

The communication network 210 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 210 may be implemented as one of the different types of networks, such as intranet, local area network (LAN), wide area network (WAN), the internet, and the like. The communication network 210 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 210 may include a variety of network devices, including routers, bridges, servers, modems, computing devices, storage devices, and the like. In one implementation, the communication network 210 is the internet which enables communication between the server 205 and the device 215 which generates the pulsed electromagnetic waves 215.

In one embodiment of the present disclosure, the device 215 is configured for generating pulsed electromagnetic waves in the frequency range of 2.4 to 2.5 GHz (ISM Band) and the generated pulsed electromagnetic waves are radiated using a unidirectional antenna or an omnidirectional antenna or both. The electromagnetic waves are pulsed with variations in echo train length, duty cycle, and pulse amplitude according to the local conditions, that is, the ambient temperature and relative humidity or both of the geographical area. The radiated pulsed electromagnetic waves create dielectric effect under the influence of a spatially non-uniform electric field. As a result, the small pollutant particles undergo a net translational motion via the dielectrophoretic force, causing their motion to accelerate, and the pollutant particles in the air settle down as a result of aggregation of the pollutant particles, thereby reducing their concentrations in the air. The manner in which the pulsed electromagnetic waves are generated and radiated for reducing the particulate pollutants in air is described in detail further below.

Figure 3:
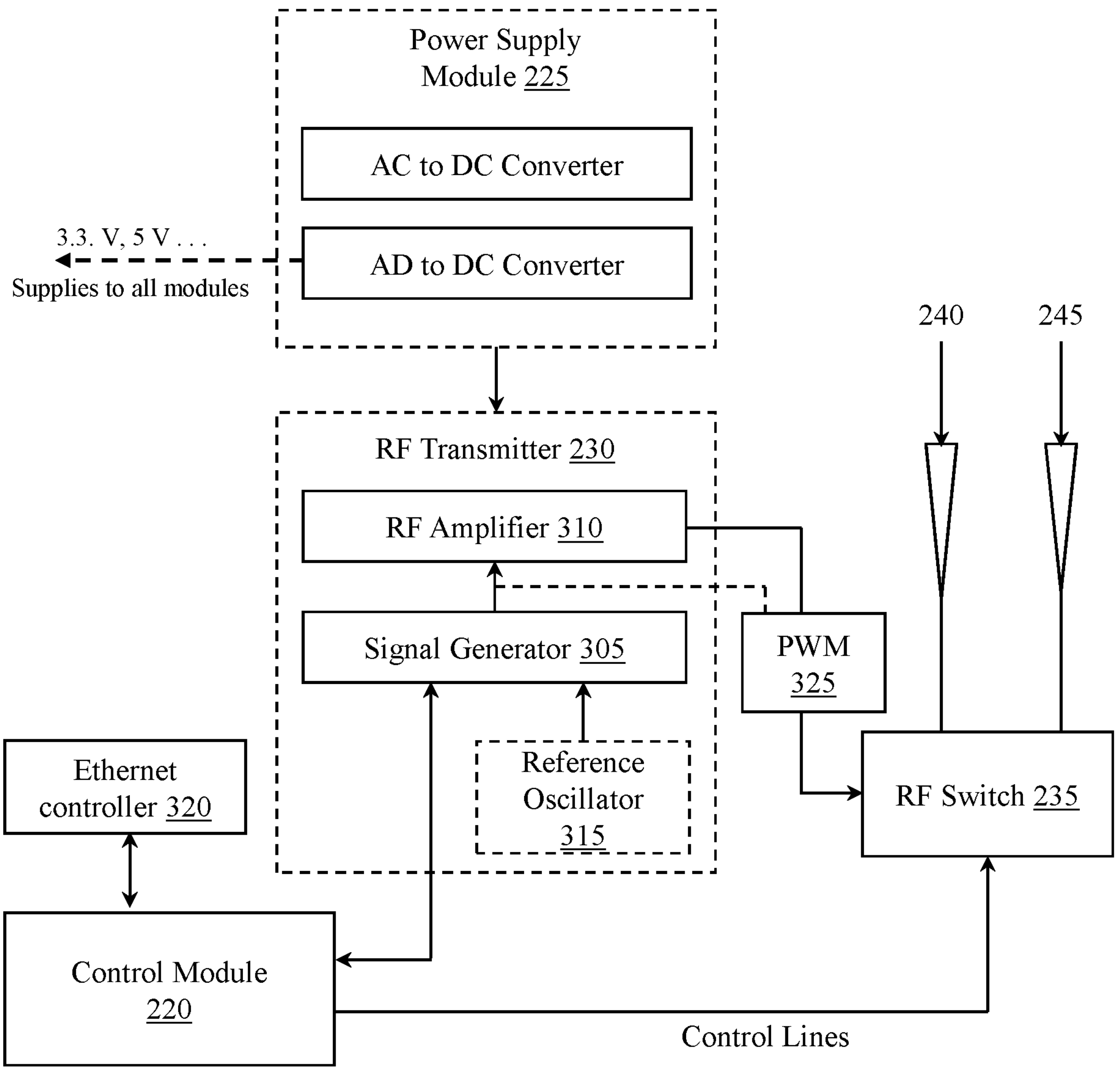
FIG. 3 is a detailed block diagram of the device 215 for generating and radiating the pulsed electromagnetic waves for reducing the particulate pollutants in air in accordance with an embodiment of the present disclosure.

FIG. 3 is a detailed block diagram of the device 215 for generating and radiating the pulsed electromagnetic waves for reducing the particulate pollutants in air in accordance with an embodiment of the present disclosure. As shown and described with reference to FIG. 2, the device 215 comprises the control module 220, power supply module 225, the RF transmitter 230, the RF switch 235 and two antennae 240 and 245. Further, in one embodiment of the present disclosure, the RF module 230 comprises a signal generator 305, an RF amplifier 310 and a reference oscillator 315. Functions of said modules in generating the pulsed electromagnetic waves are described in detail further below.

The control module 220 includes a microcontroller for controlling the various operations of the device 215, In one implementation, the control module 220 is 8-bit microcontroller operating with an internal clock of 32 MHz (Programmable). The control module 220 controls an Ethernet controller 320, the signal generator 305 (RF Synthesizer), the RF Amplifier 310 and the RF switch 235. The communication between control module 220 (microcontroller) and the Ethernet controller 320 is through SPI Protocol. One end of the Ethernet controller 320 is connected to the control module 220 and the other end is connected to RJ 45 Connector. The control module 220 receives remote control data via communication modem and through the Ethernet controller 320. In one implementation, the control module 220 and the signal generator 305 communicate through SPI protocol. In one embodiment of the present disclosure, the control module 220 is used to program the signal generator 305 for proper output frequency, duty cycle and output power. The output power of the signal generator 305 may be varied by steps of 3 dB. The Ethernet controller 320 can communicate with 2G/3G/LTE and Ethernet supported modem, there by establishing internet access. The control module 220 ensures remote monitoring as well as control and variation of the RF pulse parameters.

The power supply module 225 is mediated through an adapter with AC Input at 90~264 VAC, 50/60 Hz and DC Output at 12 V, 2 A, 24 W. The supply voltages of all ICs in the device are either 3.3V or 5V. In one implementation DC to DC converters or regulators are used to step down the voltage from adapter into two levels. The maximum current drawn by each regulator is 1 A. Both the regulators receive 12 V from the AC to DC adapter. The DC to DC converters converts the DC voltage to 3.3 V and 5 V. For adequate power dissipation, proper heat sink selection and the copper area under the module is in place. Additionally, provided is an EMI filter circuit of DC to DC converter to effectively reduce EMI noise for both conducted and radiated test by filtering the input voltage. The power supply module 225 supplies DC operating voltages to all the modules of the device 215.

As described, the device 215 generates the pulsed electromagnetic waves in the frequency range of 800 MHz to 5 GHz and the generated pulsed electromagnetic waves are radiated using one of the unidirectional antenna and the omnidirectional antenna. In particular, the signal generator 305 generates the signal with the desired frequency from a reference input from the reference oscillator 315, the generated signal is amplified using the RF amplifier 310, the amplified signal is periodically interrupted for generating the pulsed signal (pulsed electromagnetic waves), and the pulsed electromagnetic waves are radiated through one of the antenna 240 and 245, selected using the RF switch 235, into the air. The pulsed electromagnetic waves accelerate the agglomeration of particulate matter suspended in the air thereby accelerating the precipitation of the particulate matter, and thereby reducing the proportion of particulate matter suspended in the air. It is to be noted that the pulsed electromagnetic waves may be generated in one or more methods. As described, in one implementation, the signal is generated using the signal generator 305, the signal is amplified using the RF amplifier 310, and the amplified signal is interrupted before feeding it to the antenna for generating the pulsed signals (pulsed electromagnetic waves). In another implementation, the signal is generated using the signal generator 305, the generated signal is interrupted before feeding it to the RF amplifier 310 for generating the pulsed signal, and the pulsed signal is amplified and fed to the antenna. A pulse width modulator 325 for interrupting the signal is shown in FIG. 3. In yet another implementation, a pulsed signal is generated using the signal generator 305, and then the pulsed signal is power amplified and fed to the antenna. It is to be noted that the signal generator 305 and the RE amplifier 310 are digitally controlled to attain the required power and the duty cycle. As described, any one of the method may be implemented for generating the pulsed electromagnetic waves. The pulse width modulator 325 is shown in FIG. 3 for illustrating one of the methods.

Referring back to FIG. 3, in one embodiment of the present disclosure, the signal generator 305 is configured for generating a signal in the frequency range of 800 MHz to 5 GHz from a single reference frequency from the reference oscillator 315. That is, the signal generator 305 receives RF reference input from the RF oscillator 315 and produces an output. The minimum RF output power is −4 dBm and maximum is +5 dBm. The output frequency is programmable in the RF synthesizer 305 and the output is fed to the RF amplifier 310.

As described, the reference oscillator 315 inputs a reference frequency to the signal generator 305 for generating signal of 800 MHz to 5 GHz. In one implementation, 25 MHz temperature compensated crystal oscillator is used for generating 25 MHz reference signal. In the present case the reference oscillator 315 is selected to have the preferred frequency of 25 MHz with a piezo electric or any other suitable reference.

In one embodiment of the present disclosure, the RF amplifier 310 is a variable gain RF amplifier which receives the signal from the signal generator 305 and controls the output power from the signal generator 305. The output of the RF amplifier 310 is connected to the RF switch 235.

In one embodiment of the present disclosure, the RF switch 235 is used for selecting one of an omnidirectional antenna 240 or a directional antenna 245 for radiating the pulsed electromagnetic radiation into the atmosphere. In a preferred embodiment, the RF switch 235 is a digitally controlled single pole double throw switch configured for taking input from RF amplifier 310. The output RF1 or RF2 is selected, for radiating electromagnetic radiation through an omnidirectional antenna 240 or a directional antenna 245, through the logic control voltages from control module 220. The RF switch 235 provides desired isolation between the two RF paths.

The antennae 240 and 245 are broad range omnidirectional and directional antennae for radiating pulsed electromagnetic waves into the atmosphere. The omnidirectional antenna 240 is used for all round coverage to induce agglomeration of the particulate matter all around the antenna 240. The directional antenna 245 is used when the source of the pollution is known and the emission of particulate matters is to be controlled at the source, to prevent particulate matters from spreading to a larger area. Based on the application, one of the antennae 240 and 245 are selected through the RF switch 235 through the control module 220.

Working Mechanism

The control module 220 of the device 215 controls the RF signal generator 305, the RF switch 235 and digital step attenuator in the variable gain RF amplifier 310. The reference oscillator 315 provides the reference frequency required for the RF signal generator 305. Based on the reference signal and the control from the control module 220, the RF signal generator 305 produce an output in four different levels (between −4 dBm and 5 dBm) at a frequency of 800 MHz to 5 GHz (programmable as per the local conditions). This RF signal is amplified to levels that can be digitally controlled using control module 220 (by controlling attenuation of digital step attenuator) by the variable gain RF amplifier 310. The output power of the variable gain RF amplifier 310 drives the externally connected antennae. The antennae are connected through single pole double throw switch 235 which is controlled by the control module 220. Using internet access, the device 215 can also be accessed remotely through the server 205 and the communication network 210 to select the of antenna and pulse modulation parameters.

During operation, one of the antennae 240 and 245 radiates the pulsed electromagnetic waves into the atmosphere. The radiated pulsed electromagnetic waves create dielectric effect under the influence of a spatially non-uniform electric field. As a result, the small pollutant particles undergo a net translational motion via the dielectrophoretic force, causing their motion to accelerate, and the pollutant particles in the air settles down as a result of agglomeration of the pollutant particles, thereby reducing the air pollution.

The use of pulsed electromagnetic waves in the Wi-Fi® frequency range reduces the levels of particle pollutants in ambient and indoor air spaces to mitigate air pollution. The pulsed radio wave technology reduces particulate pollutants (PM2.5 and PM10) by a minimum of 33% and 50-60% in most of cases. Certain gaseous pollutants (typically as aerosols or secondary particulate pollutants) such as nitrogen oxides, Sulphur dioxide, and carbon monoxide are reduced by 20-30% depending on their initial concentration. Unlike conventional air purifiers which make use of HEPA filters, pulsed radio wave technology uses an omnidirectional antenna or a directional antenna to generate weak radio waves in a specific pulsed sequence. Because radio waves are able to travel over long distances (compared to cell phone signals, Bluetooth, or Wi-Fi), the technology is able to work over large distances. The pulsed radio waves accelerate the velocity of the small particle pollutants (<20 microns) and aerosols, increasing their clearance through a natural process called dry deposition.

The system and device disclosed in the disclosure for reducing particulate pollutants in air, using pulsed electromagnetic waves, doesn't require fans or filters and hence sustainable with low recurring cost in comparison with convention air purifier or air pollution control systems. Further, the device covers larger area as the pulsed radio waves cover an average of 1000-2000 m radius, which is at least ten times more than the conventional purifiers. Furthermore, the device utilizes minimum power of 30 W, and doesn't produce noise.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for reducing a proportion of particulate matter suspended in air, the method performed by a device, and the method comprising:

generating, by a signal generator, a radiofrequency signal of a predetermined frequency;

power amplifying, by a power amplifier, the generated radiofrequency signal for feeding to a transmitting antenna for radiating as an electromagnetic wave;

periodically interrupting, by a pulse width modulator, the power amplified radiofrequency signal from reaching the transmitting antenna, for a predetermined duration, for generating a pulsed radiofrequency signal, wherein the predetermined duration of the periodic interruption is adjusted based on one or more of an ambient temperature and a relative humidity at a geographical location of the device, and wherein the radiofrequency signal is pulsed with variations in echo train length, duty cycle, and pulse amplitude according to the ambient temperature and the relative humidity at the geographical location of the device; and feeding the pulsed radiofrequency signal to the transmitting antenna and radiating pulsed electromagnetic radiation into the air by the transmitting antenna.

2. The method of claim 1, wherein the predetermined frequency lies in a radiofrequency range.

3. The method of claim 1, wherein the predetermined frequency lies in a frequency range of 800 MHz to 5 GHz.

4. The method of claim 1, wherein the predetermined frequency is between 2.4 GHz and 2.5 GHz.

5. A device for reducing a proportion of particulate matter suspended in air, the device comprising:

a signal generator for generating a radiofrequency signal of a predetermined frequency;

a power amplifier for power amplifying the generated radiofrequency signal for feeding to a transmitting antenna for radiating an electromagnetic wave; and a pulse width modulator for periodically interrupting the power amplified radiofrequency signal from reaching the transmitting antenna, for a predetermined duration, for generating a pulsed radiofrequency signal, wherein the predetermined duration of the periodic interruption is adjusted based on one or more of an ambient temperature and a relative humidity at a geographical location of the device, and wherein the radiofrequency signal is pulsed with variations in echo train length, duty cycle, and pulse amplitude based on the ambient temperature and the relative humidity at the geographical location of the device, and wherein the transmitting antenna is for radiating pulsed electromagnetic radiation into the air.

6. The device of claim 5, wherein the signal generator is configured for generating the radiofrequency signal of frequency in a frequency range of 800 MHz to 5 GHz.

7. A system for managing reduction of a proportion of particulate matter suspended in air, the system comprising:

a remote server communicatively coupled to the device of claim 5, the remote server comprising:

data and instructions configured for one or more of:

monitoring a state of health of the device; and communicating operating instructions to the device for operating the device depending on one or more factors selected from a group of factors, comprising the geographical location of the device, a current atmospheric condition at the geographical location of the device, an estimate of pollution characteristics at the geographical location and one or more inputs provided by a user of the device.

* * * * *